(12) United States Patent
Sakakibara

(10) Patent No.: US 6,719,893 B2
(45) Date of Patent: Apr. 13, 2004

(54) METHOD FOR REMOVING PHOSPHORUS FROM WATER TO BE TREATED USING AN ELECTRIC FIELD

(75) Inventor: Yutaka Sakakibara, Oomama-machi (JP)

(73) Assignee: Gunma University, Maebashi (JP)

( * ) Notice: Subject to any disclaimer, the term of this patent is extended or adjusted under 35 U.S.C. 154(b) by 12 days.

(21) Appl. No.: 10/052,445

(22) Filed: Jan. 23, 2002

(65) Prior Publication Data

US 2002/0185383 A1 Dec. 12, 2002

(30) Foreign Application Priority Data

Jun. 11, 2001 (JP) ............................. 2001-175192

(51) Int. Cl.$^7$ ............................................. C02F 1/461
(52) U.S. Cl. .................... 205/742; 205/751; 205/758
(58) Field of Search .................................. 205/742, 751, 205/758

(56) References Cited

U.S. PATENT DOCUMENTS 6,471,873 B1 * 10/2002 Greenberg et al. ........... 210/748
2002/0056674 A1 * 5/2002 Iseki et al. .................. 210/143

FOREIGN PATENT DOCUMENTS

| JP | 55-3812 A | | 1/1980 |
| JP | 10-225691 A | | 8/1998 |
| JP | 11-114574 | * | 4/1999 |
| JP | 2000-176456 | * | 6/2000 |
| JP | 2000-233189 A | | 8/2000 |

* cited by examiner

Primary Examiner—Arun S. Phasge
(74) Attorney, Agent, or Firm—Oliff & Berridge, PLC

(57) ABSTRACT

Phosphorus is removed from water to be treated by immersing electrodes into a tank filled with the water to be treated, applying a DC voltage between the electrodes to generate hydroxide ions through a cation migration in the water and/or an electrolysis, and precipitating phosphate ions in the water as a salt slightly soluble in water.

16 Claims, 3 Drawing Sheets

METHOD FOR REMOVING PHOSPHORUS FROM WATER TO BE TREATED USING AN ELECTRIC FIELD

BACKGROUND OF THE INVENTION

1. Field of the Invention

This invention relates to a method for removing phosphorus from water to be treated. More concretely, the invention relates to a method for removing phosphorus from water to be treated, wherein an electric field is formed in the water to be treated to accumulate hydroxide ions or an electrolysis is conducted to generate hydroxide ions, whereby phosphate ions in the water to be treated are precipitated as a salt slightly soluble in water.

2. Description of Related Art

As the conventional method for removing phosphorus from water to be treated, there are known a method of adding a flocculant such as calcium hydroxide, an iron salt, an aluminum salt or the like, a method of adding an adsorbent such as a clay mineral, alumina or the like, a method of conducting absorption with a multiplying microbe, and so on. In these methods, however, operations become complicated and an amount of sludge generated is large, so that the application to a real-scale water treatment equipment is few. On the other hand, there is a method wherein a few amount of a seed crystal of calcium is added to precipitate a hydroxy apatite as the method for the removal of phosphorus decreasing the generation of the sludge, but this method is not yet put into practical use due to problems in the treating stability to an actual waste water and the like.

SUMMARY OF THE INVENTION

It is, therefore, an object of the invention to solve the above problems and to provide a novel method for removing phosphorus from water to be treated, wherein the treating operation is very simple and the removal of phosphorus can be conducted in a higher efficiency without adding chemicals.

The inventors have made various studies for solving the above-mentioned problems and as a result, the invention has been accomplished. According to the invention, there is the provision of a method for removing phosphorus from water to be treated, which comprises immersing electrodes into a tank filled with the water to be treated, applying a DC voltage between the electrodes to generate hydroxide ions through a cation migration in the water and/or an electrolysis, and precipitating phosphate ions in the water as a salt slightly soluble in water.

There are the followings as a preferable embodiment of the invention:

(1) The tank is filled with granular solids;
(2) The electrodes are a multi-electrode system;
(3) The cation migration and accumulation and/or the electrolysis are conducted while flowing the water to be treated through the tank;
(4) The granular solids are sands, glass beads, or shells;
(5) The multi-electrode system is porous or meshed;
(6) The water to be treated contains calcium ions and/or magnesium ions; and
(7) A phosphorus compound removed from the water to be treated is recovered by back wash.

Moreover, optional combinations of the above items (1)–(7) are also preferable, otherwise specified.

BRIEF DESCRIPTION OF THE DRAWINGS

The invention will be described with reference to the accompanying drawings, wherein.

DETAILED DESCRIPTION OF THE INVENTION

Figure 1:
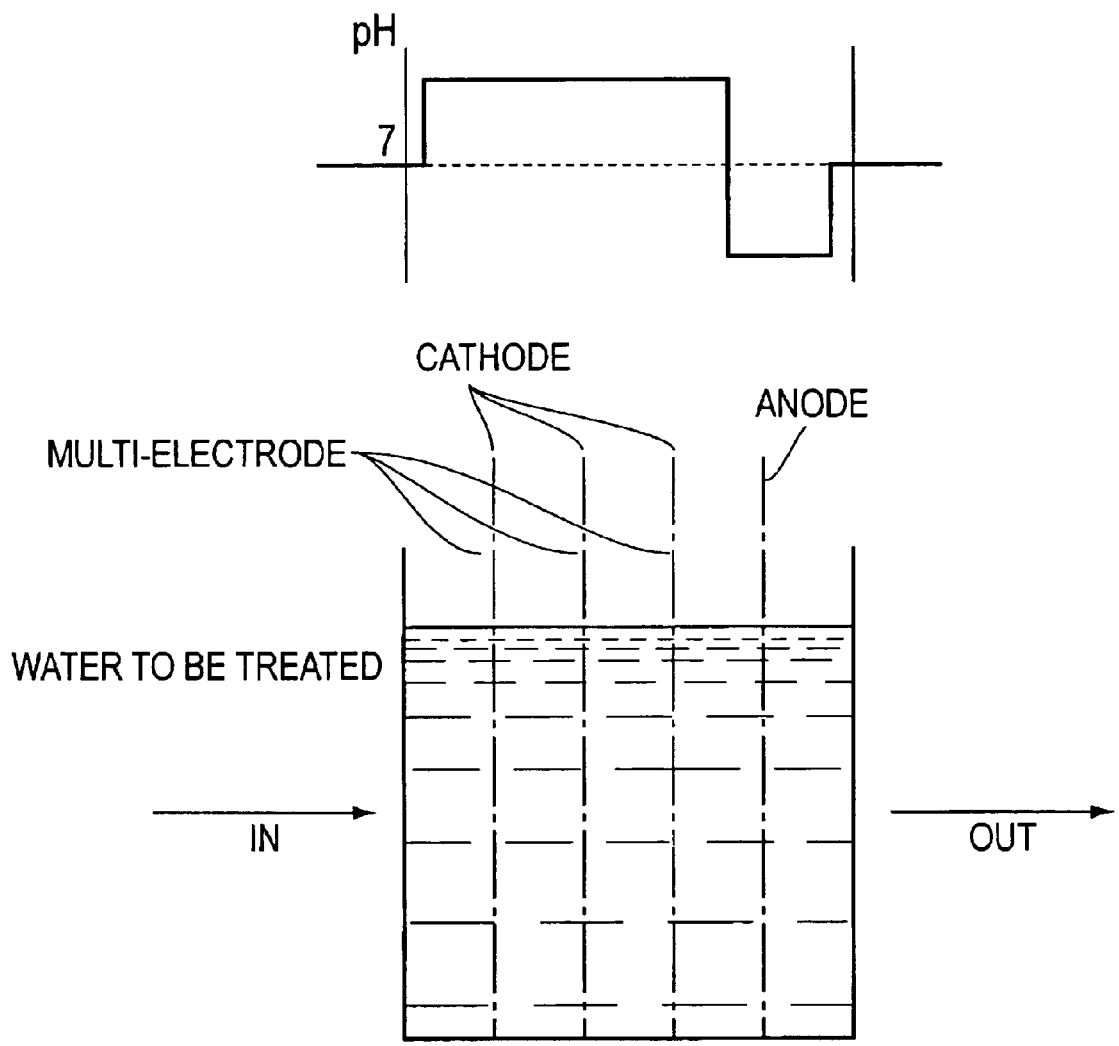
FIG. 1 is a diagrammatic view of an apparatus for removing phosphorus from water to be treated.

The method according to the invention is explained in detail below. In the invention, the electrodes are used for utilizing ion migration and/or electrochemical reaction. As a material of the electrode, titanium, iron or the like can be used in a cathode and platinum, iron or the like can be used in an anode. The form of the electrode is not particularly restricted, but includes a flat plate, a rod, a porous form, a mesh and so on. Among these forms, the porous form and the mesh are preferable from a view point of the reaction efficiency because a contact area between the electrode and the water to be treated can be increased. A water-permeable membrane can be arranged between the anode and the cathode. The water-permeable membrane includes a sponge or the like. The arrangement of the water-permeable membrane is favorable because it can prevent an alkaline water around the cathode and an acidic water around the anode from mixing. When hydrogen is generated at the cathode and oxygen is generated at the anode by applying the voltage, it is preferable to arrange a partition in at least a gas phase portion. As the partition arranged in the gas phase portion, mention may be made of a plastic sheet, a plastic plate and so on.

The electrodes used in the invention are preferable to be a multi-electrode system. The multi-electrode system in the invention is different from the conventional electrode system using a pair of cathode and anode, and is such an operation system that plural cathodes are arranged to a single anode. In the multi-electrode system, each electrode can be operated independently. On the other hand, plural anodes may be arranged to a single cathode. Though the cathode adjacent to the anode is easily affected by the anode, the cathodes other than the cathode adjacent to the anode in the multi-electrode system are hardly affected by the anode, and alkaline zones may preferably be formed around the cathodes. Therefore, the electrodes are preferably arranged so as to adjoin the same polar electrodes to each other as far as possible. For example, when three cathodes and one anode are arranged in the tank, the arrangement of cathode—cathode —cathode—anode in this order is favorable. In the invention, the number of cathodes is not particularly limited to the anode. For example, the method according to the invention is preferably carried out within the range of three to five cathodes to one anode.

In the multi-electrode system used in the invention, it is preferable to form openings capable of passing ions and water to be treated. That is, the multi-electrode system according to the invention is preferable to be porous or meshed. More concretely, a wire mesh form or an expand-mesh form is favorable as the form of the electrode. When plural cathodes are used to the anode, the alkaline zones are formed around the cathodes as mentioned above, so that phosphate ions are easily crystallized and precipitated as apatite, Ca salts or Mg salts.

The reason why the alkaline zone is formed around the cathode is considered due to the following three phenomena.

Firstly, since the plural cathodes are used, ions such as $Ca^{2+}$, $Mg^{2+}$ and the like as a main ion constituting surface water or groundwater in nature are pulled by migration to form $OH^-$ ions equivalent to these alkaline earth ions for preserving electrical neutralization, whereby the zone around the cathode is made alkaline.

Secondly, dissolved oxygen in water to be treated is reduced by the cathode to generate $OH^-$ as shown by the following reaction formula, whereby the zone around the cathode is made alkaline.

$$1/2O_2 + H_2O + 2e^- \rightarrow 2OH^-$$

Thirdly, $OH^-$ is generated at the cathode through the electrolysis of water as shown by the following reaction formula, whereby the zone around the cathode is made alkaline.

$$2H_2O + 2e^- \rightarrow H_2 + 2OH^-$$

On the other hand, $H^+$ is generated around the anode through the electrolysis of water to be acidic as shown by the following reaction formula, so that neutral treated water is discharged off from the treating tank through neutralization action of $H^+$.

$$H_2O \rightarrow 1/2O_2 + 2H^+ + 2e^-$$

In the invention, phosphate ions react with cations such as $Ca^{2+}$, $Mg^{2+}$ and the like and $OH^-$ to form, for example, $Ca_5(PO_4)_3(OH)$ at the zone around the cathode, which is precipitated and removed because it is slightly soluble in water. And also, the phosphate ions react with cations such as $Ca^{2+}$, $Mg^{2+}$ and the like to form, for example, $Ca_3(PO_4)_2$ and $Mg_3(PO_4)_2$ at the zone around the cathode, which are precipitated and removed because they are slightly soluble in the alkaline water. Furthermore, the cations such as $Ca^{2+}$, $Mg^{2+}$ and the like react with $OH^-$ to form $Ca(OH)_2$ and $Mg(OH)_2$, which are considered to adsorb and remove various hardly soluble phosphorus compounds because they have a property of adsorbing the phosphorus compound.

The size of the tank used in the invention is not particularly limited, and properly selected in accordance with the treating amount of water to be treated. The invention is also achieved by directly immersing the electrodes into a flume, a river, a lake, a pond, a reservoir, a bay or the like and applying a given voltage thereto. In the latter case, the flume, the river, the lake, the pond, the reservoir, the bay or the like itself corresponds to the tank.

According to the invention, the tank provided with the electrodes can be filled with granular solids. The granular solids used in the invention is preferable to have a property for promoting agglomeration precipitation and/or deposition reaction of phosphorus. If the tank is not filled with the granular solids, the phosphorus compound slightly soluble in water is deposited as a scale on the surface of the electrode, so that it becomes difficult to pass an electric current through the electrode. On the other hand, if the tank is filled with the granular solids, the agglomeration precipitation and/or deposition reaction of the phosphorus compound is promoted on the granular solids, so that the amount of the scale deposited on the surface of the electrode decreases and it is possible to stably pass the electric current. As the granular solids used in the invention, mention may be made of sand, pebbles, rock phosphates, glass beads, shells, active carbon, metal particles and so on, but it is not limited thereto. The size of the granular solid is not particularly limited, but it is preferable to be a range of several mm to several cm in diameter.

The term "water to be treated" used in the invention means water removing phosphorus therefrom, which includes service or waste water, fluvial water, groundwater, seawater and the like. The water to be treated, such as service or waste water, fluvial water, groundwater or seawater usually contains several 10 mg/L of $Ca^{2+}$ and $Mg^{2+}$. These cations and the phosphate ions form compounds slightly soluble in water in the presence of the hydroxide ions, which are precipitated for removing phosphorus. Therefore, the water to be treated according to the invention is favorable to contain $Ca^{2+}$ and $Mg^{2+}$. And also, the water to be treated according to the invention may contain a sludge or the like, and is not particularly required to conduct a pretreatment such as a filtration or the like.

According to the invention, the electrodes are immersed into the tank filled with water to be treated and DC voltage is applied thereto to pass a direct current therethrough. The value of the direct current is within a range of from several mA to several 100 kA. On the other hand, the value of DC voltage applied to the electrode is properly selected in accordance with the above direct current value.

The treating time for the water to be treated is within a range of from several minutes to several hours. The treating time is properly selected in accordance with the target amount of phosphorus removed from the water to be treated, and it is preferable that the larger the amount of phosphorus removed is, the longer the treating time is, and vice versa. When the treating time is long though the amount of phosphorus removed is small, the throughput of the water to be treated per unit of time is decreased, which is unfavorable in view of economical reasons.

The treating temperature is not particularly limited, and is usually that of service or waste water, fluvial water, groundwater, seawater or the like, i.e. a range of from 10° C. to 30° C. Particularly, it is not required to control the treating temperature, so that the energy cost required for the temperature control can be omitted by treating under an actual temperature of service or waste water, fluvial water, groundwater, seawater or the like.

In the invention, the phosphorus compounds deposited on the granular solids can be recovered by back wash. As the phosphorus compound recoverable by the back wash, mention may be made of $Ca_5(PO_4)_3(OH)$, $Ca_3(PO_4)_2$, $Mg_3(PO_4)_2$ and so on. These recovered phosphorus compounds can be utilized as a fertilizer or an intermediate thereof, which largely contributes to an environment protection or a circulation of resources. As a recoverable compound other than the phosphorus compound, mention may be made of $CaCO_3$, $MgCO_3$, $Ca(OH)_2$, $Mg(OH)_2$ and so on. As a liquid used for the back wash, mention may be made of water to be treated, treated water, acidic water around the anode, and a mixture thereof. In case of using the water to be treated or the treated water, it is preferable that the granular solids are fluidized to physically separate the deposited phosphorus compounds from the granular solids. On the other hand, when the acidic water around the anode is used, the deposited phosphorus compounds are dissolved in the acidic water for the recovery.

In this invention, phosphorus can be removed from the water to be treated by a batch system or a continuous system. In the batch system, it is required to conduct an operation of replacing the treated water with new water to be treated after the removal of phosphorus. The continuous system is suitable for removing phosphorus from the large amount of the water to be treated such as service or waste water, fluvial water, groundwater, seawater or the like. In case of adopting the continuous system, the granular solids are fluidized by the water to be treated to physically peel off the scale deposited on the electrodes. In the continuous system, there are a flow-through system in which the water to be treated is flowed in parallel with a direction of an electric field formed by applying DC voltage to the electrodes, and a flow-by system in which the water to be treated is flowed in a direction perpendicular to the direction of the electric field, but it is not particularly limited thereto.

As an analysis for phosphorus concentration in the invention is used, for example, an absorption spectrophotometry utilizing a molybdenum blue reaction. In this case, a molybdophosphoric acid ion is formed from the phosphate ions by adding an ammonium molybdate solution and is reduced with a tin(II) chloride in an acidic solution to form a molybdenum blue. The molybdenum blue can be colorimetrically quantified by an absorption spectrophotometer to determine the concentration of phosphorus in the aqueous solution.

The following examples are given in illustration of the invention and are not intended as limitations thereof.

EXAMPLE 1

Figure 2:
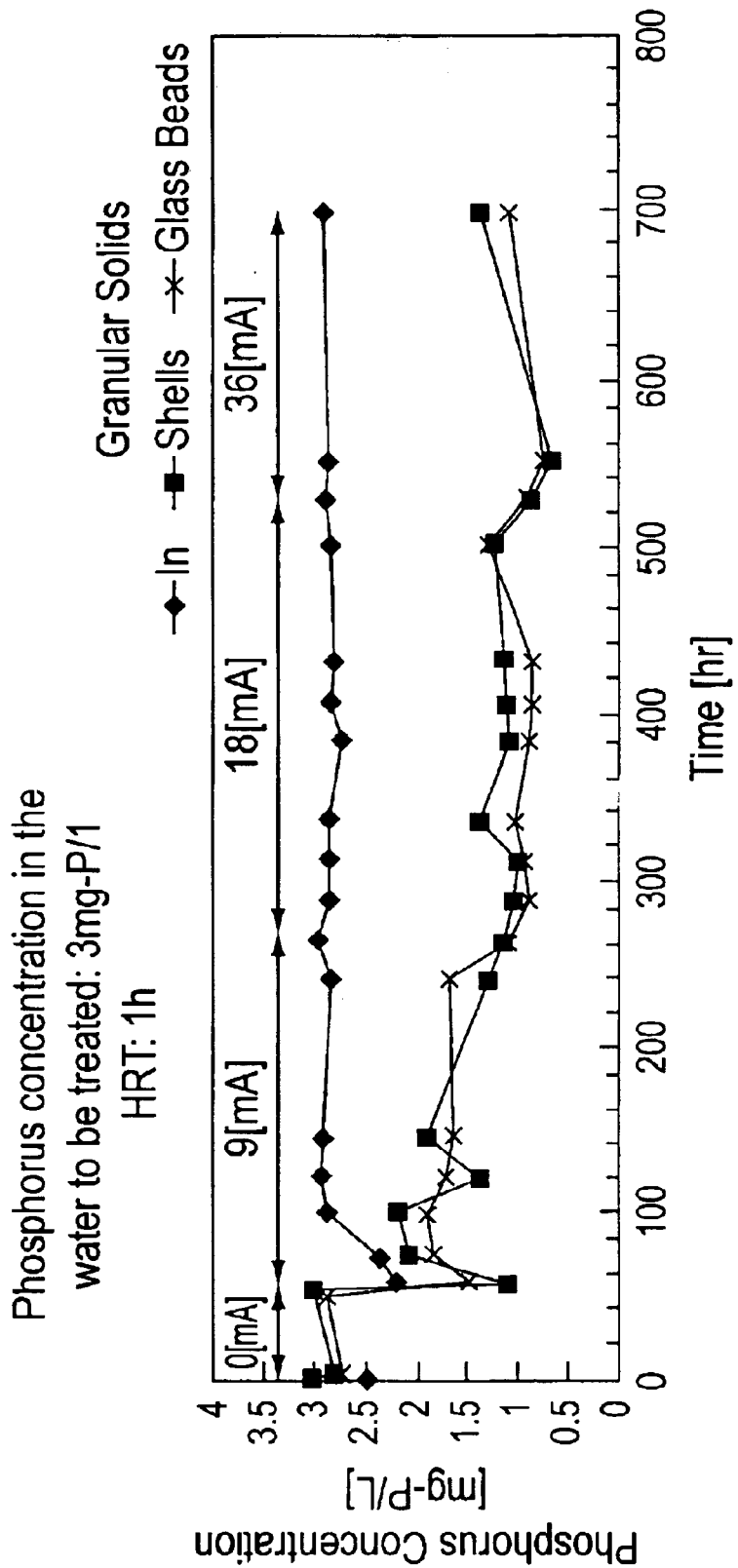
FIG. 2 is a graph showing a change of phosphorus concentration with a lapse of time in an experiment for removing phosphorus from water to be treated.

A water to be treated containing 221 mg/L of $Na^+$, 8.0 mg/L of $K^+$, 28 mg/L of $Ca^{2+}$, 24 mg/L of $Mg^{2+}$, 372 mg/L of $Cl^-$, 4.0 mg-N/L of $NO_3^-$, 32 mg-S/L of $SO_4^{2-}$, 3.0 mg-P/L of $PO_4^{3-}$ and 12 mg/L of $HCO_3^-$ is flowed through a water tank of 0.5L in capacity shown in FIG. 1, which is filled with glass beads as a granular solid and provided with a multi-electrode system consisting of three cathodes and one anode, so as to direct from the cathode side toward the anode side. In the multi-electrode system, cathode—cathode—cathode—anode are arranged in this order, and a distance between adjacent electrodes is 2 cm. The form of each electrode is wire-meshed, and the material of the electrode is titanium in the cathode and platinum in the anode. And also, a sponge is arranged between the cathode and the anode as a water-permeable membrane. The treating time for the water to be treated is one hour, during which the water to be treated in the bath is replaced with a new water to be treated. After 60 hours from the start of flowing the water to be treated, a current of 9 mA is passed to the multi-electrode system. When a phosphorus concentration of a treated water discharged from the water tank is analyzed after 160 hours from the start of passing the current, it is 1.7 mg-P/L. Moreover, the analysis of the phosphorus concentration is carried out by the absorption spectrophotometry for molybdenum blue reaction. After 200 hours from the start of passing the current of 9 mA, the value of the current is increased to 18 mA. When the phosphorus concentration of a treated water discharged from the water tank is analyzed after 240 hours from the start of passing the current of 18 mA, it is 1.3 mg-P/L. After 280 hours from the start of passing the current of 18 mA, the value of the current is increased to 36 mA. When the phosphorus concentration of a treated water discharged from the water tank is analyzed after 160 hours from the start of passing the current of 36 mA, it is 1.1 mg-P/L. The above results are shown in FIG. 2. In FIG. 2 are also shown results on the phosphorus concentration measured at points other than the above measurements.

EXAMPLE 2

The same procedure as in Example 1 is repeated except that shells are used as the granular solid. The phosphorus concentration of a treated water discharged from the water tank is 1.3 mg-P/L after 160 hours from the start of passing the current of 9 mA, 1.3 mg-P/L after 240 hours from the start of passing the current of 18 mA, and 1.3 mg-P/L after 160 hours from the start of passing the current of 36 mA. These results are shown in FIG. 2. Moreover, FIG. 2 also shows results on the phosphorus concentration measured at points other than the above measurements.

EXAMPLE 3

Figure 3:
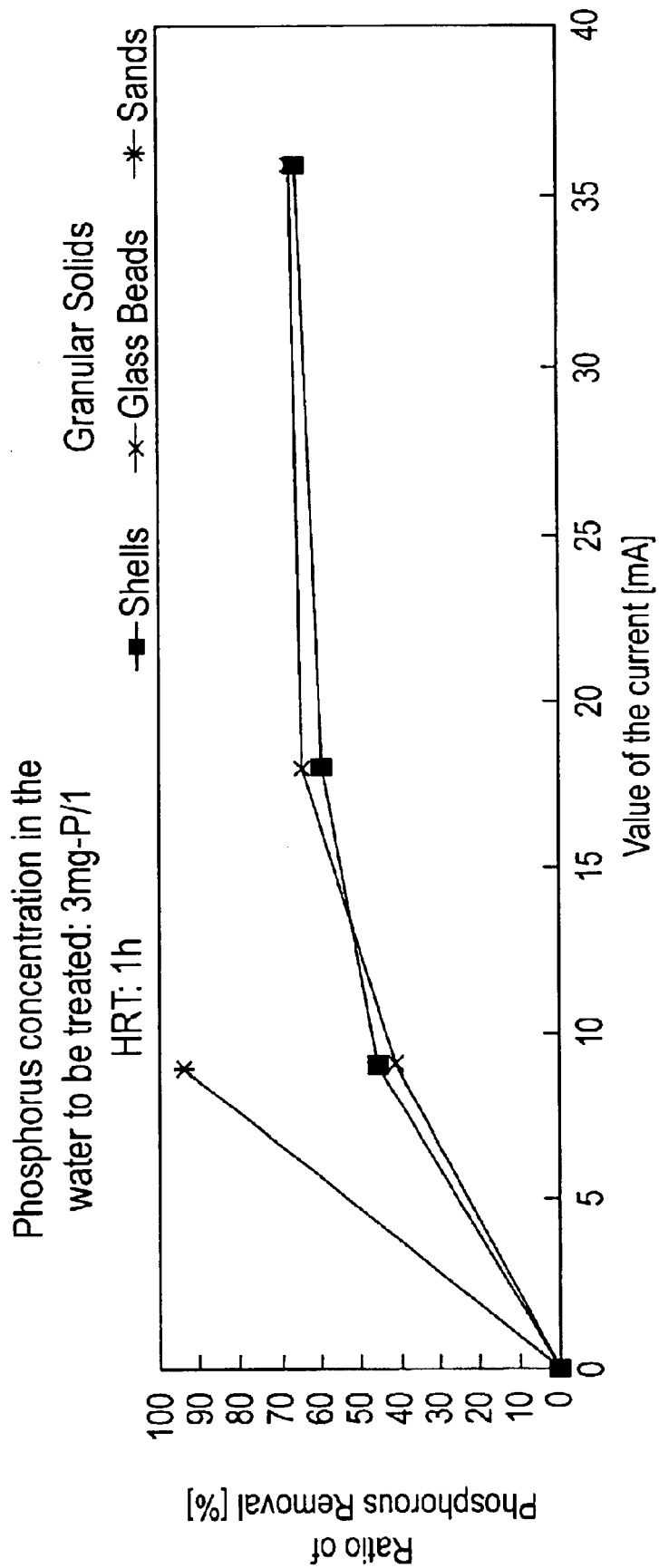
FIG. 3 is a graph showing a removal ratio of phosphorus in the experiment for removing phosphorus from water to be treated.

The same water to be treated as in Example 1 is flowed through a water tank of 0.5L in capacity, which is filled with sands as a granular solid and provided with the same multi-electrode system as in Example 1, so as to direct from the cathode side toward the anode side. The treating time for the water to be treated is one hour. After 60 hours from the start of flowing the water to be treated, a current of 9 mA is passed to the multi-electrode system. When a phosphorus concentration of a treated water discharged from the water tank is analyzed after 160 hours from the start of passing the current, it is 0.2 mg-P/L, and the ratio of phosphorus removal is 94%. The above results are shown in FIG. 3. In FIG. 3 are also shown results when glass beads or shells are used as the granular solid.

As mentioned above, the invention provides the method for removing and/or recovering phosphorus from water to be treated in a high efficiency, wherein the treating operation is very simple without adding chemicals. And also, the recovered phosphorus compounds can be used as a fertilizer or an intermediate thereof, so that the invention highly contributes to an environment protection or a circulation of resources. Furthermore, natural energy can be utilized as an electric power by using a windmill, a solar cell or the like.

What is claimed is:

1. A method for removing phosphorus from water to be treated, which comprises immersing a multi-electrode system into a tank filled with the water to be treated, applying a DC voltage to the multi-electrode system to generate hydroxide ions through a cation migration in the water and/or an electrolysis, and precipitating phosphate ions in the water as a salt slightly soluble in water, wherein the multi-electrode system is an operation system in which plural cathodes are arranged to a single anode, or plural anodes are arranged to a single cathode, and each electrode can be operated independently.

2. The method according to claim 1, wherein the tank is filled with granular solids.

3. The method according to claim 2, wherein the granular solids are sands, glass beads, or shells.

4. The method according to claim 1, wherein the cation migration and accumulation and/or the electrolysis are conducted while flowing the water to be treated through the tank.

5. The method according to claim 1, wherein the multi-electrode system is porous or meshed.

6. The method according to claim 1, wherein the water to be treated contains calcium ions and/or magnesium ions.

7. The method according to claim 1, wherein a phosphorus compound removed from the water to be treated is recovered by back wash.

8. The method according to claim 1, wherein the multi-electrode system is an operation system in which plural cathodes are arranged to a single anode.

9. A method for removing phosphorus from water to be treated, which comprises immersing a multi-electrode system into a tank filled with the water to be treated, applying a DC voltage to the multi-electrode system to generate hydroxide ions through a cation migration in the water and/or an electrolysis, and precipitating phosphate ions in the water as a salt slightly soluble in water, wherein the multi-electrode system is an operation system in which plural cathodes are arranged to a single anode, or plural anodes are arranged to a single cathode, each electrode can be operated independently, and each electrode has openings capable of passing ions and water to be treated.

10. The method according to claim 9, wherein the tank is filled with granular solids.

11. The method according to claim 10, wherein the granular solids are sands, glass beads, or shells.

12. The method according to claim 9, wherein the cation migration and accumulation and/or the electrolysis are conducted while flowing the water to be treated through the tank.

13. The method according to claim 9, wherein the multi-electrode system is porous or meshed.

14. The method according to claim 9, wherein the water to be treated contains calcium ions and/or magnesium ions.

15. The method according to claim 9, wherein a phosphorus compound removed from the water to be treated is recovered by back wash.

16. The method according to claim 9, wherein the multi-electrode system is an operation system in which plural cathodes are arranged to a single anode.

* * * * *